United States Patent [19]

Berreman et al.

[11] Patent Number: 4,505,548
[45] Date of Patent: Mar. 19, 1985

[54] BISTABLE LIQUID CRYSTAL TWIST CELL

[75] Inventors: Dwight W. Berreman, New Providence; William R. Heffner, Plainfield, both of N.J.

[73] Assignee: AT&T Bell Laboratories, Murray Hill, N.J.

[21] Appl. No.: 540,709

[22] Filed: Oct. 12, 1983

Related U.S. Application Data

[63] Continuation of Ser. No. 198,294, Oct. 20, 1980, abandoned.

[51] Int. Cl.³ ............................................. G02F 1/13
[52] U.S. Cl. .................................. 350/346; 350/341; 350/350 R
[58] Field of Search ............... 350/331 R, 333, 334, 350/341, 349, 350 R, 346; 252/299.01

[56] References Cited

U.S. PATENT DOCUMENTS

| | | | |
|---|---|---|---|
| 3,575,492 | 4/1971 | Nester et al. | 350/333 |
| 3,592,527 | 7/1971 | Conners et al. | 252/299.01 X |
| 3,833,287 | 9/1974 | Taylor et al. | 350/349 |
| 3,837,730 | 9/1974 | Hatfield et al. | 350/349 |
| 4,011,008 | 3/1977 | Gerritsma et al. | 350/350 R |
| 4,239,345 | 12/1980 | Berreman et al. | 350/350 R X |
| 4,333,708 | 6/1982 | Boyd et al. | 350/346 |
| 4,400,060 | 8/1983 | Cheng | 350/339 R X |

FOREIGN PATENT DOCUMENTS 1410329 10/1975 United Kingdom .............. 350/346

OTHER PUBLICATIONS

P. G. de Gennes, *The Physics of Liquid Crystals*, (Clarendon Press, Oxford, 1974), pp. 127, 264–273.
Thurston, R. et al., "Mechanically Bistable Liquid Crystal Display Structures," *IEEE Transactions on Electron Devices*, vol. ED-27, No. 11, (Nov. 1980), pp. 2069–2080.
Cheng, J. et al., "Switching Characteristics and Threshold Properties of Electrically-Switched Nematic Liquid Crystal Bistable Configuration Devices," *1980 IEEE Biennial Display Research Conference*, (Oct. 1980), pp. 180–182.
Lehman, O., "On Flowing Crystals," *Zeitschrift fur Physikalische Chemie*, pp. 462–472, (1889).

*Primary Examiner*—John K. Corbin
*Assistant Examiner*—Richard F. Gallivan
*Attorney, Agent, or Firm*—Peter A. Businger

[57] ABSTRACT

A bistable liquid crystal twist cell is disclosed. The cell has at least two states which are stable in the presence of a single given holding voltage. The states may be switched from one to the other by short-term variation in the magnitude of the applied voltage.

3 Claims, 2 Drawing Figures

BISTABLE LIQUID CRYSTAL TWIST CELL

This application is a continuation of application Ser. No. 198,294, filed Oct. 20, 1980, abandoned.

FIELD OF THE INVENTION

This invention involves liquid crystal twist cells which are characterized by at least two stable states and which may be switched back and forth between the stable states.

DISCLOSURES OF INTEREST

In the late 1880's, Reinitzer and Lehman discovered that certain liquids may display ordering on a molecular level in a manner analogous to the ordering found in solid crystals (see for example, O. Lehman, Z. Phys. Chem., 4, 462 (1889)). The ordering is generally manifested by a roughly parallel alignment between the various liquid crystal molecules. For example, liquid crystal molecules which are rod-like in shape may align roughly parallel to one another in a manner similar to the "ordering" found in a school of fish. Many liquid crystal molecules are rod-like in shape, and some may be disc-like in shape, however, all have anisotropic physical and optical properties. The significance of this anisotropy lies in the fact that as a result of the anisotropy the ordering of the liquid crystal may be altered by exposure to appropriate electric fields. Such a change in ordering may have associated with it a change in the transmission characteristics of the liquid crystal because of the liquid crystal's anisotropic optical characteristics. (While in this discussion "transmission characteristics" refers to transmission of any electromagnetic radiation, primary applications will be in the field of optical transmission, that is, transmission of visible electromagnetic radiation, usually designated to be of wavelength from approximately 4500 to approximately 8000 Angstroms.)

Although characteristics of liquid crystals were well known by the turn of the 20th century, and practical application for display devices may have been considered, it was not until the 1960's that the liquid crystal devices were constructed in a manner which permitted controlled alteration of the liquid crystal orientation so as to vary the transmission characteristics of the cell. These devices were the first liquid crystal cells with significant potential for use as display elements.

Initial devices operated on the basis of a phenomenon known as dynamic scattering. Liquid crystal cells associated with such devices are characterized by at least two different states. In one of these states the liquid crystal is ordered. In the other state, which is induced by the presence of an electric field, the liquid crystal is disordered. Since the transmission characteristics of the cell are different in the ordered state than in the disordered state, the cell may be used as a display device. In such a device the disordered region, for example, may look light while the ordered region may look dark. Alphanumeric characters may be formed by appropriately selective application of an electric field.

In contradistinction to early liquid crystal display devices which made use of the dynamic scattering phenomenon, other early fabricated liquid crystal cells did not depend on the existence of disordered states. Such devices are characterized by the work of Schadt and Helfrich (See, M. Schadt and W. Helfrich, Appl. Phys. Lett., 18, 127 (1971)). Such Schadt-Helfrich cells, as they are commonly called, have associated with them at least two states both of which are ordered, but which have different molecular orientations. The transmission characteristics of such cells are dependent upon the particular state of the liquid crystal. Consequently, a display device may be fabricated by taking advantage of the difference in transmission characteristics of the cell from one state to the other.

A specific embodiment of the Schadt-Helfrich cell involves a liquid crystal cell in which the liquid crystal in at least one of the states is oriented in a helical configuration, with the helical axis approximately perpendicular to the bounding surface and the helix extending from one surface of the cell to the other. Such cells are commonly referred to as liquid crystal "twist" cells. Operation of twist cells depends upon the effect that the liquid crystal has on the polarization of electromagnetic radiation transmitted through the cell. In the at least one twisted state the polarization of the electromagnetic radiation entering the cell approximately parallel to the axis of the helix is rotated during its transversal of the cell as a result of the helical variation in the orientation of the liquid crystal molecule from one surface of the cell to the other. The different orientation of the liquid crystal in the second state results in a quantitatively different effect of the second state of the polarization of the incident light. Use of appropriate polarizers and analyzers allows one to take advantage of this difference in polarization to obtain different transmission characteristics between the two states. In such devices the liquid crystal cell may be switched from one transmitting state to another nontransmitting state by application of appropriate fields whose influence on the liquid crystal results in a change in the orientation of the liquid crystal and a resultant change in its optical transmission characteristics.

In some circumstances, the optical anisotropy of the liquid crystal is not sufficient to result in optical discrimination between the two states. In such situations "guest" materials may be added whose orientation follows the orientation of the liquid crystal and whose optical characteristics are sufficiently anisotropic to yield the required discrimination between the two states. Guest material may also be used in other situations to avoid the use of polarizers and/or analyzers. Such devices are known generically as guest-host cells (see, G. H. Heilmeier, J. A. Castellano and L. A. Zanoni, Mol. Cryst. Liq. Cryst., 8, 293 (1969), and G. H. Heilmeier and L. A. Zanoni, Appl. Phys. Lett., 13, 91 (1968)).

In the cells described above, the particular states are stable only when an appropriate field (including zero field) is applied across the cell. This field must differ depending upon the state. While such designs yield practical devices, shortcomings inherent in the requirement that a field be applied to maintain the cell in a given state, and particularly that a different field be applied depending upon the particular state, necessitates the use of an impracticably large number of contacts to the cell in order to display a complex image. The requirement of a large number of contacts is related to the need for continually addressing the cells with proper fields in order to maintain each cell in its proper state. Such problems, although they will not be delved into here in detail, fall within the generic term of "multiplexing", and have limited the application of liquid crystal twist cells to relatively simple display devices (see A. R. Kmetz and F. K. von Willisen, eds., "Matrix Addressing of Non-Emissive Displays", in *Non-Emissive Electrooptic Displays*, Plenum, N.Y., 1967).

Recently, a liquid crystal twist cell was disclosed which is characterized by stable states that require the application of a field only during switching, and which does not require the application of a field to maintain the cell in a particular state (see, U.S. Pat. No. 4,239,345 filed Apr. 16, 1979 now allowed, hereby incorporated by reference, and D. W. Berreman and W. R. Heffner, Appl. Phys. Lett., 37, 109 (1980)). Such cells, commonly referred to as bistable liquid crystal twist cells, have, for the first time, rendered practical the application of liquid crystal cells to large-scale display devices.

SUMMARY OF THE INVENTION

This invention is a bistable liquid crystal twist cell in which the at least two stable states are maintained by application of the same given holding voltage—hence differing from prior art cells which require the application of different voltages to maintain different states (Schadt-Helfrich cell) or do not require a holding voltage at all. Switching between the at least two stable states is effected by application of a perturbing field for the short period of time necessary to convert the liquid crystal from one state to another. Subsequent to switching, the field is returned to the holding voltage value and the cell remains stable in its new configuration. The use of a holding voltage permits operation of a bistable cell over a wider range of cell parameters. Characteristic of this new class of cells is the fact that the switching may occur "adiabatically" without appeal to any dynamic properties of the liquid crystal. The inventive devices may be viewed as falling within the generic class of previously disclosed bistable liquid crystal twist cells (see, U.S. Pat. No. 4,239,345 filed Apr. 16, 1979. As in these previous cells the addressed region (as opposed to nonaddressed regions and boundaries) in the inventive cell is substantially free of disclinations and walls in the stable state, and switching occurs without the passage of a disclination through active region of the liquid crystal twist cell.

DETAILED DESCRIPTION OF THE DRAWINGS

The inventive bistable liquid crystal twist cell is characterized by the use of a single holding voltage to maintain the cell in the stable states. Switching between two states is effected by brief alteration of the holding voltage.

EXEMPLARY EMBODIMENT

Figure 1:
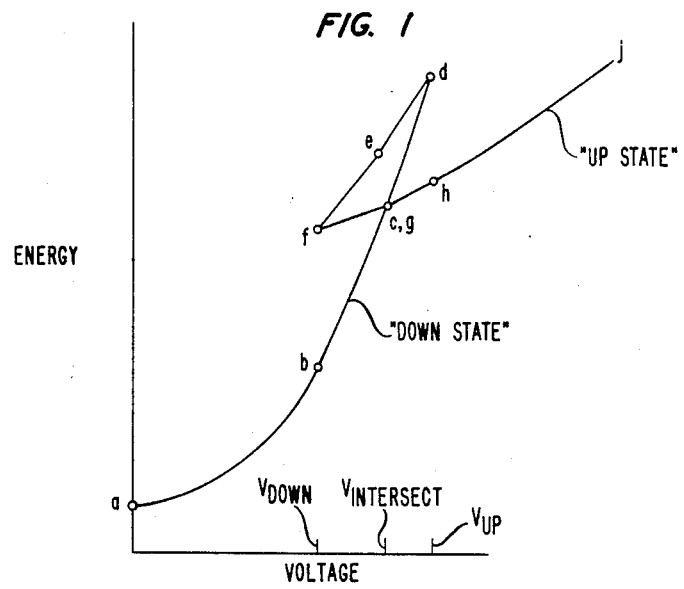
FIG. 1 is an exemplary representation of the energy characteristics of an inventive liquid crystal twist cell.

A complete understanding of the operation of the inventive cell may be aided by consideration of the specific embodiment illustrated schematically in FIG. 1. FIG. 1 is a representation of the energy characteristics of a particular inventive cell. In this figure, voltage applied to the cell is displayed on the horizontal axis and energy associated with the cell is displayed on the vertical axis. Two states, described by the figure, are the "down" state extending from point a to point d, and the "up" state extending from point f to point j. (The portion of the curve extending from point d to point f represents an unstable state.)

Behavior of the states as the voltage is raised from zero illustrates the operation of the cell. For voltages less than $V_{down}$ only down states exist. As the voltage is increased from zero to $V_{down}$, a region is reached where either the up state or the down state can exist (i.e., the voltage region from $V_{down}$ to $V_{up}$). However, the cell, being in the down state, tends to remain in the down state, since the upper state requires greater energy. As the voltage is increased to $V_{intersect}$, a point is reached where the two states are degenerate in energy. However, once again, since the cell is in the down state, it continues to exist in the down state. For values greater than $V_{intersect}$, the up state has less energy. However, the cell tends to remain in the down state in this region, because change in molecular configuration from the down state to the up state would require overcoming an energy barrier between the two states. (The line d-f represents the energy value of the barrier which must be exceeded before switching will occur.) As the voltage is increased beyond $V_{up}$, the cell can no longer exist in the down state and, consequently switches to the up state. When the cell has switched to the up state the voltage may be returned to $V_{intersect}$ and the cell will remain in the up state. Lowering the voltage below $V_{down}$ will, once again, result in switching of the cell—in this instance, from the up state to the down state. Return of the voltage to $V_{intersect}$ will then leave the cell in the down state. Practical operation of the cell then involves application of a holding voltage to all active regions of the cell, and variation of the voltage only when switching is desired.

Alternative operational characteristics may be utilized in practical devices. For example, operation of a cell of approximately constant thickness may involve an operating region where voltage is applied, surrounded by a region where no voltage is applied. In such embodiments when the operating region is in the up state, the use of a holding voltage defined by the intersection of the up and down states will result in instability of the operating region, and its ultimate decay to the down state. This is so, since for the conditions defined the energy of the up and down states at the holding voltage are degenerate and the operating region which is in the up state is surrounded by a region which is in the energetically degenerate down state. Under such circumstances, the surrounding region which is in the down state will ultimately grow into the operating region through a "wall". Consequently, practical embodiments benefit from the use of a holding voltage which is above $V_{intersect}$. Typically, holding voltage values will be greater than $V_{intersect}$ by an amount greater than 10 percent of the difference in voltage between $V_{intersect}$ and $V_{up}$. Such a holding voltage will impede the decay of the up state to the down state since at this holding voltage the up state has lower energy than the down state, i.e., transformation of the up state to the down state requires additional energy which is not available. Needless to say, the holding voltage should, however, never approach the value of $V_{up}$ since for these values the down state switches to the up state. Alternatively, the surrounding regions may be of different thickness, with an applied voltage.

The discussion of the preferable values for the holding voltage is predicated upon the use of a liquid crystal with positive dielectrical anisotropy. A liquid crystal with negative dielectric anisotropy would have similar considerations where, however, the up and down labels in FIG. 1 are reversed.

Characteristic of some of the inventive cells is the fact that the switching phenomenon need not rely on the dynamics associated with the motion of the liquid crystals. Rather, switching may occur even if the switching points f and d are approached slowly. This is distinguished from switching which occurs only when the dynamics associated with the motion of the liquid crystal molecules is considered. The class of liquid crystal cells which need not rely on liquid crystal dynamics for switching are characterized somewhat loosely as "adiabatically switchable". However, despite the fact that such cells need not rely on the dynamics of the liquid crystal molecules for switching, advantage may be taken of such dynamics to yield more rapid switching characteristics. So, for example, switching may be effected by altering the holding voltage to a point beyond the points d or f. Under these circumstances, proper mathematical description of the cell behavior requires consideration of energy contributions due to the dynamic characteristics associated with the motion of the liquid crystal molecules. Within the terminology adopted here the liquid crystal twist cell would still be referred to as "adiabatically switchable" insofar as the practitioner using this cell need not inherently appeal to the fluid dynamic characteristics of the liquid crystal for switching. Within the broad definition of this invention is included cells for which only one switching point is adiabatically switchable, whereas the other switching point may be only dynamically switchable.

While it has been assumed that regions which are not being switched are maintained at a given holding voltage value, practical utilization of multi-region cells may include variation of voltage applied to all addressable regions during switching, even those regions which are not being switched. Such circumstances would occur by alteration of the voltage applied to regions being switched in magnitudes necessary for switching, and alteration of voltage to regions not being switched in magnitudes less than that necessary for switching. The significance of such alternative embodiments lies in the relative simplification obtained in multiplexing when a varying voltage is applied to all addressable regions, with only those regions which are to be switched exposed to voltage alteration sufficient for switching.

Figure 2:
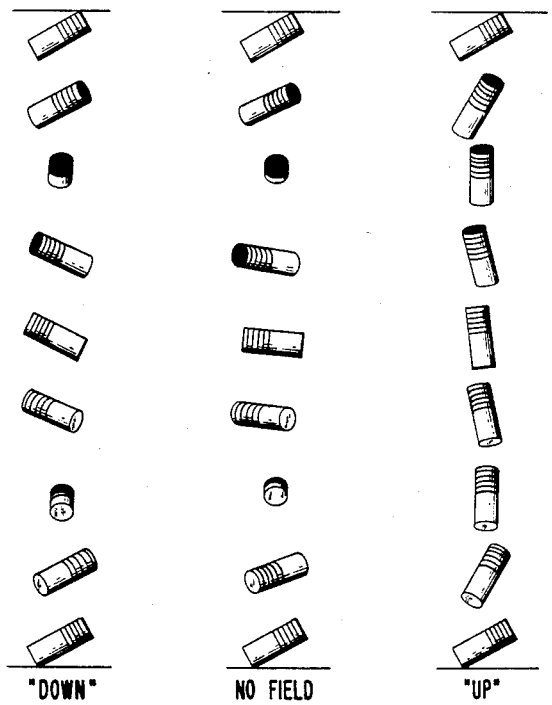
FIG. 2 is a schematic representation of the liquid crystals in various states associated with an exemplary inventive cell.

FIG. 2 is a schematic representation of the orientation of the liquid crystal molecules in a specific embodiment of the invention cell. Note that the representation of FIG. 2 is consistent with the energy curve of FIG. 1. The up state is so designated since in this state liquid crystal molecules near the center of the cell are oriented relatively perpendicular to the cell surface. In the down state, and in the no field state which is a down state, the molecules near the center of the cell are oriented relatively parallel to the cell surface. Optical discrimination between these two states may be obtained through the use of a polarizer, polarization analyzer or guest material. In the down state the polarization of the impinging radiation will be rotated by an amount different than in the up state thereby permitting optical discrimination between the two states.

DESIGN CONSIDERATIONS

The complexity of liquid crystal devices has, in the recent past limited the development of liquid crystal technology when such development depended exclusively on experimental analysis of various cell configurations. The multiplicity of such configurations makes their study in the laboratory so time consuming that advances cannot be expected with any degree of certainty, and such a mode of investigation is thereby rendered impractical. Consequently, recent practitioners in this field have begun to analyze various cell configurations using computer techniques and have thus made significant advances. The results of these analyses are used to direct experimental efforts. The present invention arose in this manner out of the realization that within the infinte number of mathematical descriptions of liquid crystal twist cell configurations there exists a class of cells which may be described by energy curves that have associated with them at least two states which are stable when a single appropriate holding voltage is applied. These states may be switched back and forth between each other adiabatically and without passing a disclination through the active region of the liquid crystal twist cell.

Computation of liquid crystal configurations which fall within this description uses techniques easily taught to the practitioner in the art. The calculation involves consideration of energy contributions due to the elastic strain and applied fields. The elastic strain field is due to the straining of the liquid crystal resulting from the boundary conditions and the applied electric field. Such elastic strain energy was first applied to the description of liquid crystal twist cells by Oseen and Frank (see, C. W. Oseen, Trans. Discuss. Faraday Soc., 29, 883 (1933) and F. C. Frank, Discuss. Faraday Soc., 25, 17 (1958)). The electric static field contribution has been described by Gruler, Scheffer and Meir (see, H. Gruler, T. J. Scheffer and G. Meier, Zett. Naturforsch., 27A, 966–976 (1972), "Elastic Constants of Nematic Liquid Crystals I. Theory of the Normal Deformation"). The characteristics of the liquid crystal formulation by means of appropriate elastic and dielectric constants. The equations are solved by the known Euler-LaGrange techniques to ultimately yield descriptions of particular cell configurations in terms of an energy vs. voltage curve. Solution of the Euler-LaGrange equations yields particular cell configurations for which the energy may be calculated. Clearly, numerous curves may be obtained depending upon the boundary conditions and constants selected. Within this large number of solutions applicants have discovered solutions with the characteristics of the inventive cell.

On the basis of the calculations described above, plots are obtained for voltage vs. displacement field assuming various starting parameters. Numerical techniques are then used to determine the behavior of the applied voltage as a function of the displacement field at equilibrium, given the assumed parameters of the system. In practice, the equations are solved by assuming a given displacement field and calculating the resulting voltage. Solutions are then selected which are triple valued in displacement as a function of voltage. Such solutions will generally have associated with them the general Gibbs-free energy vs. voltage behavior shown in FIG. 1 and, hence, will be bistable with a given holding voltage as described above.

Preferable starting parameters for the numeric calculation involve liquid crystals with dielectric anisotropies greater than 5 and cell thicknesses of approximately one twist length. The inventive cells generally involve liquid crystals which are twisted in at least one of the stable stages, and which in another of the stable states may be constrained to be either untwisted, or to have a twist other than its unconstrained value. Usually the net twist in the two states will either be the same or differ by an integral number of turns. In at least one of the stable states the liquid crystal may be subject to a zero torque about an axis perpendicular to the surface. However, in at least one other of the stable states the liquid crystal will have torque about an axis perpendicular to the surface. Unlike the pitch associated with the liquid crystal directors, the tilt of the directors associated with the liquid crystal molecules will always have a value other than that which would be assumed by the directors in the absence of the boundaries, i.e., the tilt will always have a value other than 90 degrees from normal at one or both of the boundaries.

While the numerical techniue for constructing the inventive cell is, perhaps, the most efficient, requiring less than a half an hour's computer time on simple computers, experimental techniques may be also utilized to construct the inventive cell. Such techniques may involve, for example, fabricating a wedge in which a twisted liquid crystal under study is placed. The wedge surface would include means to align adjoining liquid crystal molecules. As an increasing voltage difference is applied between the two surfaces of the wedge-shaped cavity, a "wall" traversing the wedge is found to move. Bistability is indicated by disappearance of the wall at one location and its reappearance elsewhere, or its more rapid motion, at a given voltage. Characteristics of the wedge cell in the region where the wall has appeared and disappeared are then utilized to fabricate a cell with the inventive characteristics.

EXAMPLE

In a specific embodiment of an inventive cell glass slides coated with tin oxide were used to confine the liquid crystal. The slides were further coated with silicon monoxide evaporated at an angle of 5 degrees from parallel to the surface. The tin oxide is formed in an electrode pattern and is used to apply appropriate voltages to yield, for example, an alphanumeric configuration, while the evaporated silicon monoxide is used to align the directors near the cell walls (see, J. L. Janning, Appl. Phys. Lett., 21, 173 (1972)). The liquid crystal used was E7 obtained from the British Drug House doped with about 1.342 percent of cholesteryl nonanoate. Subsequent to insertion of the liquid crystal within the cell, the cell surfaces are epoxied together about the periphery of the cell at a cell thickness of 13.95 microns. Total twist was 360 degrees in the cells. The tilt angle of the liquid crystal near the surfaces was determined to be 55 degrees from the normal by the method of Crossland et al. (Journ. Phys. D., Appl. Phys., 9, 100 (1976)). The holding voltage in this case is 1.7 volts. Switching from the down state to the up state first occurs at about 1.8 volts while switching from the up state to the down state first occurs at about 1.5 volts. For fast switching the dynamic characteristics of the cell were also employed and dynamic switching from the up state to the down state was obtained by dropping the voltage to zero for 0.075 seconds. Dynamic switching from the down state to the up state was obtained by raising the voltage to 3 volts for 0.055 seconds. Dynamic switching of this nature depends both on the magnitude of the variation in voltage and the time for which such a variation voltage is applied. Hence, applying similar voltage for less times or less voltage variations for equal time periods is found to be ineffective for dynamic switching. Consequently, an embodiment of matrix addressing which requires that all elements receive some voltage may be utilized even in the dynamic switching mode. A polarizer and analyzer were used to obtain optical discrimination between the two states. The analyzer was placed parallel to the direction of evaporation of the silicon monoxide coating and the polarizer was oriented perpendicular to that direction. The cell was oriented in an optical bench and tilted in various directions to study the contrast dependence of the impinging radiation. Calculations indicate that a cell with total twist of 270 degrees may have useful optical characteristics if comparable tilt angles in the two states are obtainable.

We claim:
1. A liquid crystal twist cell comprising
   (a) a cholesteric liquid crystal which, in an unstrained state, assumes a helical configuration,
   (b) bounding surfaces, at least one of which transmits electromagnetic radiation at a wavelength of interest,
   (c) means to align the liquid crystal molecules adjoining the bounding surfaces,
   (d) means to apply a voltage difference across at least a portion of the cell, and
   (e) means to optically discriminate between at least two clear states corresponding to different orientations of the liquid crystal,
   the invention characterized in that
      the liquid crystal has at least two clear stable states when in the presence of a single nonzero holding voltage, which clear stable states may be switched from one to the other without passing a disclination through the cell.
2. The device of claim 1 wherein the stable states are switched from one to the other by changing the magnitude of the applied voltage.
3. The device of claim 1 wherein the liquid crystal is adiabatically switchable.

* * * * *